US011561533B2

(12) United States Patent
Bliss et al.

(10) Patent No.: US 11,561,533 B2
(45) Date of Patent: Jan. 24, 2023

(54) STREAMLINING THE COMMISSION OF NETWORK IDENTIFIERS

(71) Applicant: Rockwell Automation Technologies, Inc., Mayfield Heights, OH (US)

(72) Inventors: Ronald Bliss, Twinsburg, OH (US); Jessica E. Forguites, Willoughby Hills, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 208 days.

(21) Appl. No.: 17/039,595

(22) Filed: Sep. 30, 2020

(65) Prior Publication Data

US 2022/0100174 A1    Mar. 31, 2022

(51) Int. Cl.
| | | |
|---|---|---|
| *G05B 19/418* | (2006.01) | |
| *G06F 9/38* | (2018.01) | |
| *G06F 9/44* | (2018.01) | |
| *H04L 41/08* | (2022.01) | |
| *G06F 9/4401* | (2018.01) | |
| *H04L 41/0803* | (2022.01) | |

(52) U.S. Cl.
CPC ....... *G05B 19/4185* (2013.01); *G06F 9/3836* (2013.01); *G06F 9/4401* (2013.01); *H04L 41/0803* (2013.01)

(58) Field of Classification Search
None
See application file for complete search history.

(56) References Cited

U.S. PATENT DOCUMENTS

| | | | | |
|---|---|---|---|---|
| 11,172,564 | B2* | 11/2021 | Slupik | H05B 47/19 |
| 2005/0163118 | A1* | 7/2005 | Steindl | H04L 61/5038 |
| | | | | 370/389 |
| 2014/0229620 | A1* | 8/2014 | Horman | H04L 47/783 |
| | | | | 709/226 |
| 2016/0359802 | A1* | 12/2016 | Shpak | H04L 61/5014 |
| 2017/0034308 | A1* | 2/2017 | Kande | H04L 67/125 |
| 2018/0027071 | A1* | 1/2018 | Toepke | H04L 67/12 |
| | | | | 709/217 |
| 2018/0088432 | A1* | 3/2018 | Shrivastava | G05B 19/042 |
| 2018/0235468 | A1* | 8/2018 | Khachaturian | A61B 5/0008 |
| 2019/0068758 | A1* | 2/2019 | Lange | H04L 12/40 |
| 2019/0313907 | A1* | 10/2019 | Khachaturian | G16H 40/67 |
| 2021/0066960 | A1* | 3/2021 | Kriete | G08B 5/38 |
| 2021/0227673 | A1* | 7/2021 | Haverlag | H05B 47/195 |
| 2021/0377170 | A1* | 12/2021 | Lee | H04L 45/741 |

* cited by examiner

*Primary Examiner* — Philip Wang

(57) ABSTRACT

To facilitate the commissioning of network identifiers (network IDs), an ordered list comprising network ID's associated with devices of an industrial automation process may be generated and stored. Based at least on the ordered list, a network ID may be identified. A prompt may be generated and displayed, the prompt comprising a notification to power-off one or more devices. Another prompt may be generated and displayed, the prompt comprising a notification to power-on a single device of the industrial automation process. In response to receiving a network-identifier request from the single device, a device identifier may be identified for the single device and stored in a list. A response comprising the network ID and a command to change the assignment mode of the device is autonomously generated and transmitted to the single device, which subsequently stores the network ID changes its mode.

18 Claims, 8 Drawing Sheets ation process. In response to
receiving a network-identifier request (e.g., a BootP/DHCP
request) from the single device, a device identifier (e.g., a
MAC address) is identified and/or detected for the single
device and stored in a list (e.g., the ordered list). A response
comprising the network ID is autonomously generated and
STREAMLINING THE COMMISSION OF NETWORK IDENTIFIERS

TECHNICAL FIELD

Aspects of the disclosure are related to computing hardware and software technology, and in particular to industrial automation applications.

TECHNICAL BACKGROUND

Industrial automation environments utilize networked machines and/or systems during the industrial manufacturing process. The machines and/or systems may include any number of devices such as drives, pumps, motors, sensors, robots, etc. These devices may have various moving parts and other components that are driven by communications sent and received between disparate components of the machines and/or systems.

Devices capable of connecting to a network (e.g., Ethernet network) are typically assigned a unique machine identifier (e.g., tag, label, Media Access Control ("MAC") address) at the time the device is manufactured. This address is a unique set of characters (e.g. 9C-35-5B-5F-4C-D7) used to identify the device on the network. The MAC address is available electronically by sending a message to a device and is traditionally listed on a physical label on a device.

Industrial automation machines and systems are often designed (e.g., control logic for devices may be written, etc.) before the components of the machines and/or systems are manufactured. As a result, the components of the machines and/or systems are typically designed to direct their communications to a network identifier (e.g., Internet Protocol ("IP") addresses, etc.) of a specific device.

Existing techniques for associating network identifiers with their specific devices include manually applying a network address (e.g., Ethernet IP address) to a device via physical switches and/or via a boot/DHCP protocol that can assign a specific network address to the device based on a specific port to which the device is connected or from a server computer connected to the same network as the device. Using existing techniques to connect devices of a large machine or system to a network tend to be error prone and often require a large amount of human capital (e.g., numerous man hours to manually associate network addresses with their respective devices) and computing resources (e.g., maintenance of numerous ports through which the devices may connect to the network).

Recording the assignment of network identifiers and/or addresses to devices can also be tedious and error prone. For example, some solutions require manual construction of a table that includes machine identifiers and various machine descriptions. Additionally, machine identifiers are often obtained manually (e.g., one or more people may physically visit each device of a system to obtain machine identifiers, machine descriptions, device names, etc. for each device/component of the system). Similarly, network identifiers and/or addresses may also be manually correlated to each device of the system.

The above-described deficiencies are merely intended to provide an overview of some of the problems of conventional systems, and are not intended to be exhaustive. Other problems with conventional systems and corresponding benefits of the various non-limiting embodiments described herein may become further apparent upon review of the following description.

OVERVIEW

Provided herein are systems, methods, and software to facilitate commissioning of network identifiers ("network ID's"). In at least one implementation, an ordered list comprising network ID's (e.g., Ethernet IP addresses) associated with devices of an industrial automation process is generated and stored. Based at least on the ordered list, a network ID may be autonomously located or otherwise identified. A prompt may be generated and displayed, the prompt comprising a notification to power-off and/or re-boot one or more devices of the industrial automation process. Another prompt is generated and displayed, the prompt comprising a notification to power-on and/or boot a single device of the industrial automation process. In response to receiving a network-identifier request (e.g., a BootP/DHCP request) from the single device, a device identifier (e.g., a MAC address) is identified and/or detected for the single device and stored in a list (e.g., the ordered list). A response comprising the network ID is autonomously generated and transmitted to the single device, which subsequently stores the network ID locally. A command to change the assignment mode of the single device to a static assignment mode may be sent to the single device, which subsequently changes its mode to the static assignment mode.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
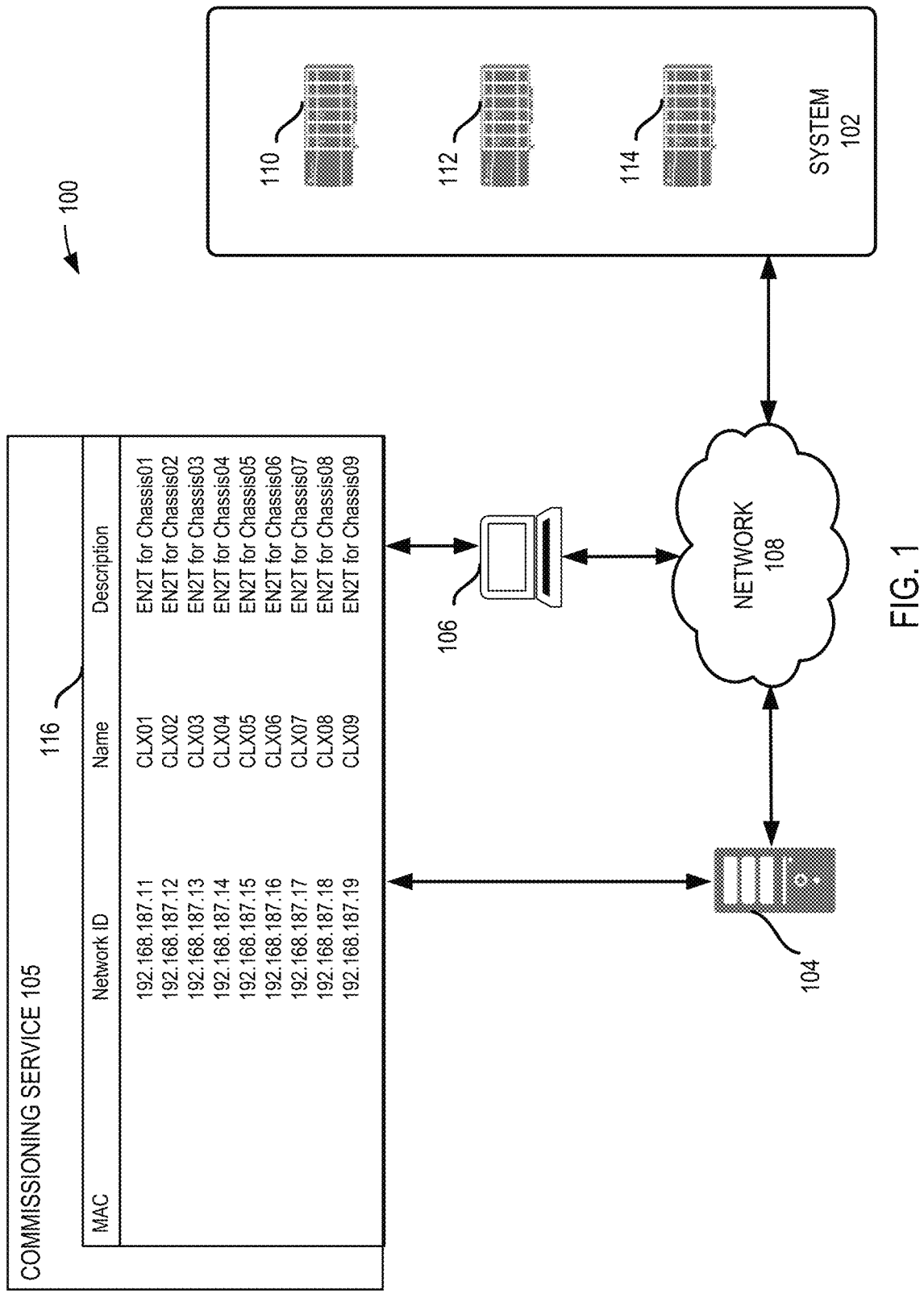
FIG. 1 illustrates an architecture of a computing system in an exemplary implementation.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations described herein provide for streamlining the commissioning of network ID's (e.g., Ethernet IP addresses) in association with industrial automation devices. A network ID may be assigned when a device powers-on, boots-up, and/or re-boots. Network ID's may be assigned dynamically, automatically, and statically. A dynamic assignment may result in the network ID of a device changing every time the device boots (e.g., because the range of possible network ID's could change each time the device boots). An automatic assignment may result in the network ID of a device changing every time the device boots, but the range of possible network ID's is permanently assigned to at least the device and/or industrial automation system. A static assignment uses the same network ID every time the device boots (e.g., a single IP address is associated with a single device).

Assigning static network ID's and/or network identification addresses to a device of an industrial automation environment enables disparate devices to maintain reliable communication. Specifically, storing a static network ID on a device ensures that the device will have the same (i.e., static) network ID every time it powers-up. For example, a device may be booted in a dynamic mode. As a result of being in the dynamic mode, the device will request assignment of an IP address (i.e., network ID). Once the IP address is assigned and/or stored on the device, the mode of the device may be switched to static thereby preserving the assigned IP address with the device. As a result, when the device is booted again, the device may not transmit another request for an IP address (e.g., because the device has preserved in memory the IP address assigned to it).

By maintaining static network ID's, connected devices may maintain reliable communications with each other. For example, a connected device may be designed to transmit its communications to a specific network ID. When a receiving device operates in a static mode and is assigned the specific network ID, then the connected device may send a communication and have the communication reliably delivered to the receiving device. If, instead, the connected device sends a communication to a receiving device having an inconsistent network ID (e.g., the receiving device operates in either a dynamic or automatic assignment mode, a new IP address is assigned to the receiving device every time the receiving device powers-on, etc.), then communications sent by the device may not be reliably delivered (e.g., the communication may instead be sent to a sensor currently using the previously assigned IP address, etc.).

Traditionally, the definition of network IDs is assigned early in the lifecycle of an automation system. This can occur many weeks or months before the devices are purchased or available. By making these assignments early, controller programs, Human Machine Interface ("HMI") displays, and Manufacturing Execution Systems ("MES") can be developed. Without this pre-assignment, control system development would need to wait for device acquisition or worst installation before it could proceed. This results in a serial project schedule that would delay development for weeks or months waiting for devices to be commissioned. One alternative includes developing the system with one set of network IDs and then later reconfiguring the system using the addresses determined during the commissioning phase. This alternative permits the project to be developed but results in significant re-work and errors because of changes made late in the project development cycle. Another solution includes defining the network IDs early in the lifecycle of the project and later associating the resulting devices with the pre-defined network IDs.

Autonomously and/or semi-autonomously correlating a network ID with a device identifier (e.g., during the device commissioning process) may further achieve the technical effect of reducing errors caused by, time required to, and computing resources required to commission a network ID to a device of an industrial machine and/or system. These improvements over existing techniques enhance installation of industrial machines and/or systems in an industrial automation process. For example, traditional mechanisms to establish static IP addresses include manually finding a MAC address on a label of a device and manually entering the MAC address for storage in association with a pre-defined network ID.

Turning now to the drawings, FIG. 1 illustrates an operational architecture, architecture 100, in an implementation of streamlining the commissioning of devices with network ID's. Architecture 100 includes system 102, server 104, client computing device 106, commissioning service 105, and network 108. System 102 includes devices 110, 112, and 114; however, system 102 is not limited to the number of devices shown in FIG. 1 and may include more or less devices.

System 102 may be connected to server 104 through network 108. The devices of system 102 may communicate with server 104 through network 108 and/or via another connection suitable for transmitting communications. System 102 may be connected to client computing device 106 through network 108. The devices of system 102 may communicate with client computing device 106 through network 108 and/or via another connection suitable for transmitting communications. Client computing device 106 may be connected to server 104 through network 108 and/or via another suitable connection.

Figure 2A:
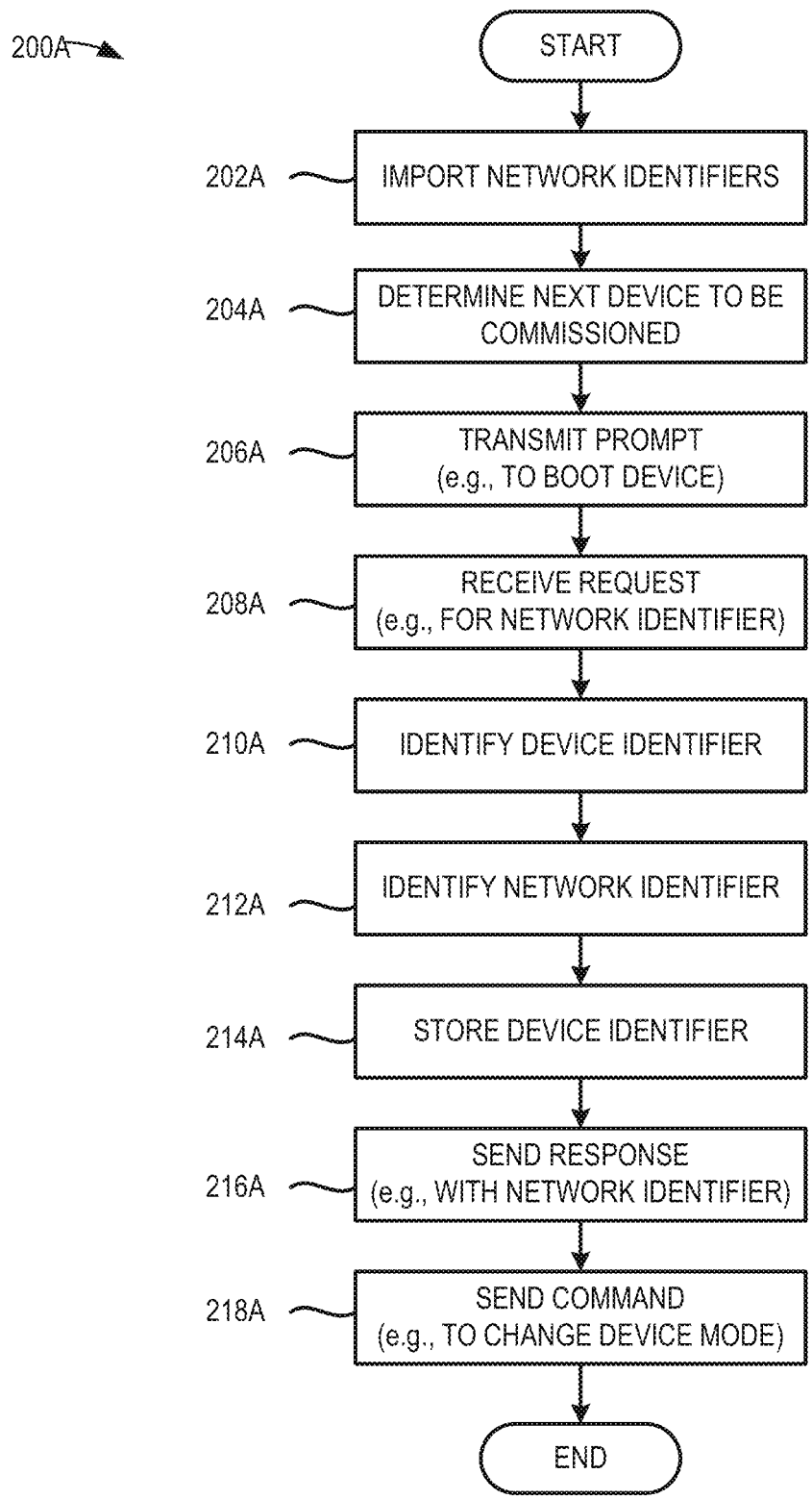
FIG. 2A illustrates an operational sequence of a computing system in an exemplary implementation.
Figure 2B:
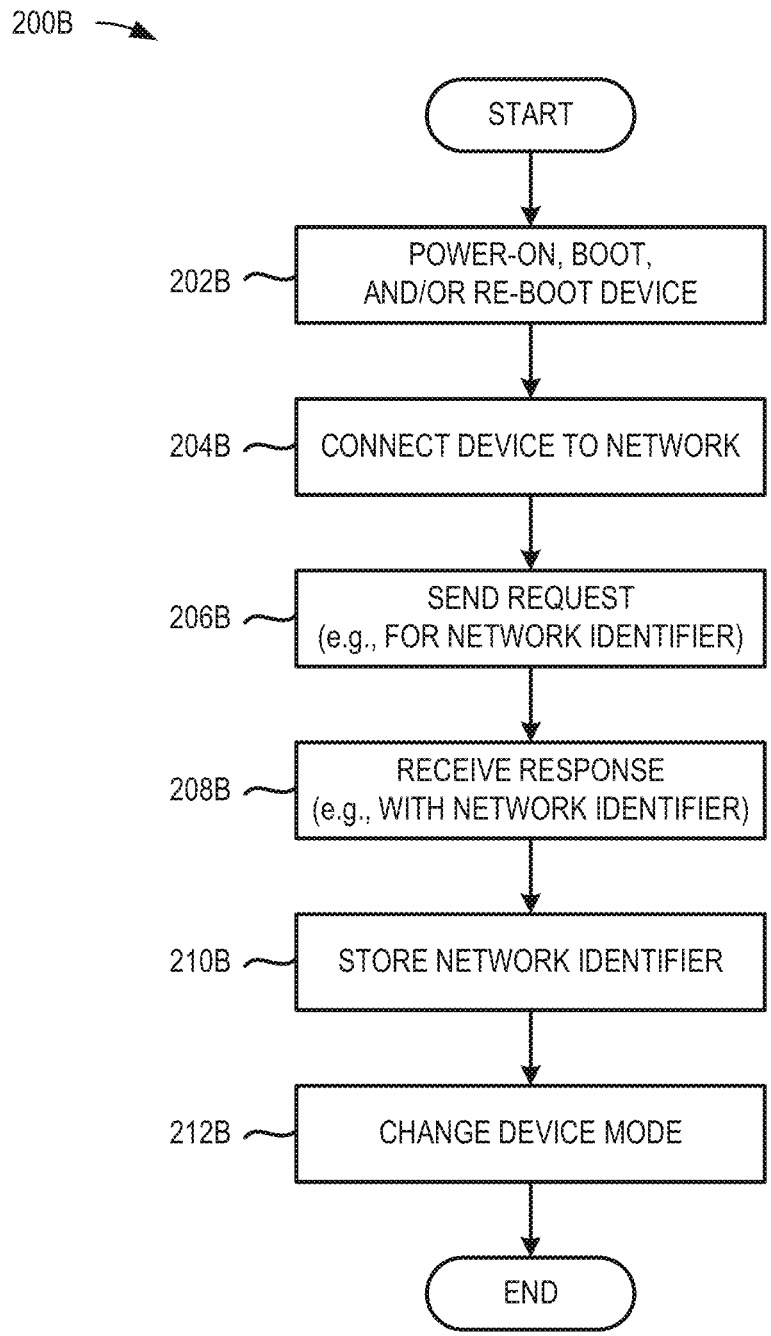
FIG. 2B illustrates an operational sequence of a computing system in an exemplary implementation.
Figure 6:
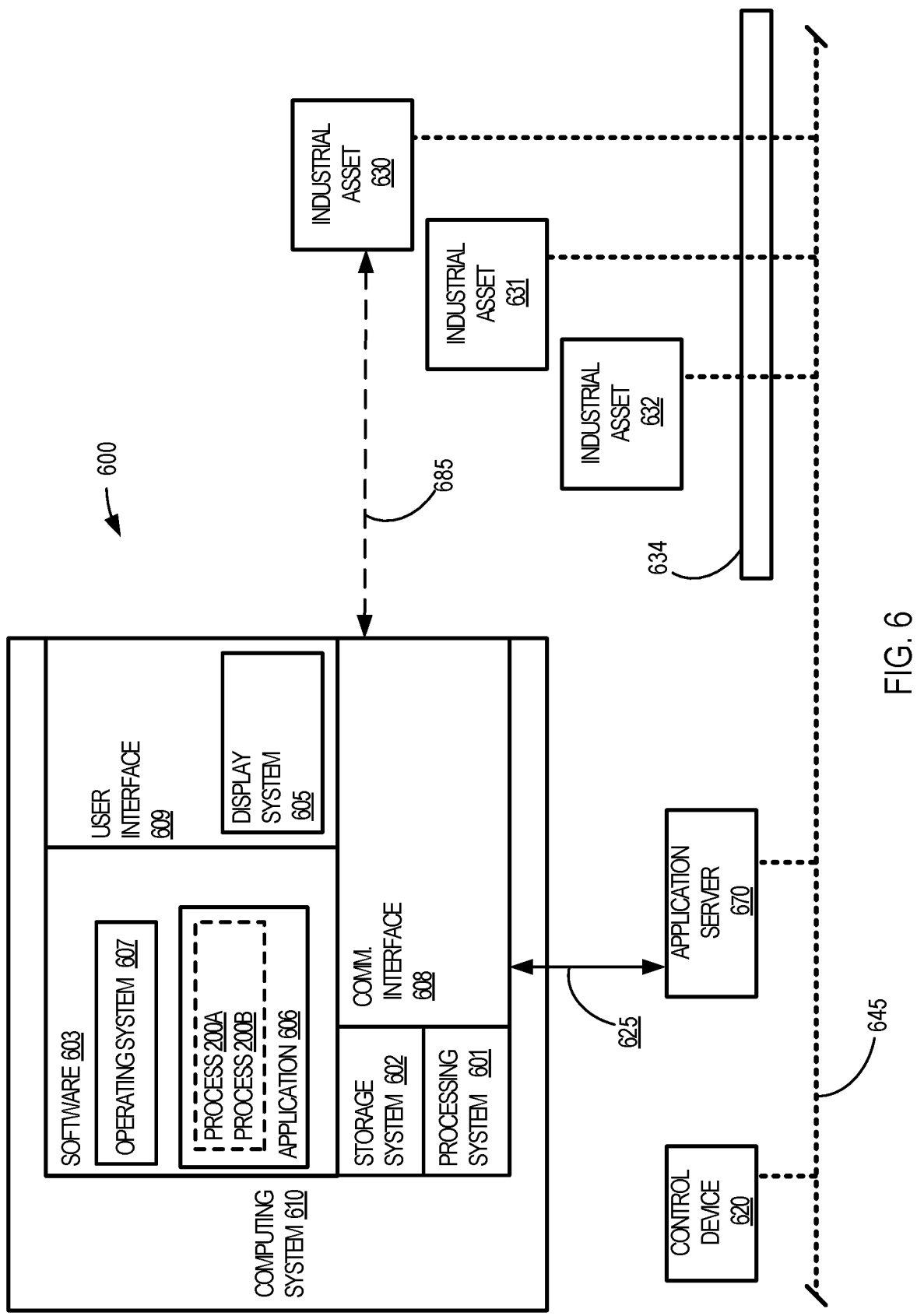
FIG. 6 illustrates an example computing system suitable for implementing any of the architectures, platforms, processes, methods, and operational scenarios disclosed herein.

The devices of system 102 (e.g., devices 110, 112, and 114) may be any subcomponent of a machine and/or system of an automated industrial environment. Industrial assets 630-632, illustrated in FIG. 6, are representative of such devices. The devices of system 102 (e.g., devices 110, 112, and 114) are configured to execute software modules and components. Commissioning process 200B, illustrated in FIG. 2B, is representative of some of the functionality that may be provided by one or more devices executing the software modules and components.

The devices of system 102 (e.g., devices 110, 112, and 114) may be operated in a dynamic assignment mode, an automatic assignment mode, and/or a static assignment mode. When in a dynamic assignment mode, a device of system 102 (e.g., devices 110, 112, and 114) may receive and/or be assigned a new network ID (e.g., any available network ID may be assigned at random) every time the device powers-on, boots, and/or re-boots. When in an automatic assignment mode, a device of system 102 (e.g., devices 110, 112, and 114) may be assigned a new network ID (e.g., any network ID available from a finite range of assigned network ID's) every time the device powers-on, boots, and/or re-boots. When in a static assignment mode, a device of system 102 (e.g., devices 110, 112, and 114) will not be assigned a new network ID when the device powers-on, boots, and/or re-boots.

Server 104 is representative of any physical or virtual computing resource, or combination thereof, suitable for facilitating commissioning of industrial automation machines and/or systems. Application server 670, illustrated in FIG. 6, is representative of such computing resources, which include server computers, virtual machines, containers, and any variation, combination, or collection thereof.

Server 104 may be configured to coordinate (e.g., via commissioning service 105) commissioning of network ID's to the devices of system 102 (e.g., devices 110, 112, and 114). In an embodiment, server 104 (e.g., via commissioning service 105) generates and transmits prompts for display (e.g., on client computing device 106). A prompt may comprise an instruction to power-off one or more devices of system 102. A prompt may comprise an instruction to power-on and/or boot a device of system 102 (e.g., device 110). A prompt may comprise a specific order in which to power-on and/or boot a device of system (e.g., an order based on table 116).

In an embodiment, server 104 receives a request generated by a single device of system 102 (e.g., device 110) for a network ID. The request may contain the device identifier (e.g., MAC address) of the single device. Subsequent to receiving the request, server 104 may generate a response to the request (e.g., via commissioning service 105). The response may have the network ID included therein. Subsequent to receiving the request, server 104 may store the device identifier (e.g., in response to detecting the device identifier in the request). In an embodiment, server 104 autonomously stores the device identifier in association with the network ID. In another embodiment, sever 104, via commissioning service 105, autonomously updates file 116 (e.g., with the device identifier).

In an embodiment, commissioning service 105 is hosted by server 104, and server 104 may access commissioning service 105 directly. In another embodiment, commissioning service 105 is hosted by a computing device external to server 104 (e.g., client computing device 106), and server 104 may access commissioning service 105 indirectly (e.g., by requesting access to commissioning service 105, by receiving content from commissioning service 105, etc.).

Commissioning service 105 may interface with various local applications to allow users to collaborate during the system and/or device commissioning process. Commissioning service 105 is implemented in program instructions that comprise various software modules, components, and other elements of the service. Commissioning process 200A, illustrated in FIG. 2A, is representative of some of the functionality that may be provided by one or more of the software elements in commissioning service 105.

Client computing device 106 is configured to display prompts that facilitate the commissioning of network ID's to the devices of system 102. For example, in an implementation, client computing device 106 may render and/or display a prompt to power-down all of the devices of system 102. In another implementation, client computing device 106 may render and/or display a prompt to boot and/or power-on a specific device of system 102. For example, the prompt may indicate that a device of system 102 will be assigned the next network ID in an ordered list of network ID's. Accordingly, client computing device may indicate a specific order in which to boot and/or power-on the devices of system 102.

Client computing device 106 may be further configured to access table 116 (e.g., via commissioning service 105). In one embodiment, table 116 is stored on client computing device 106, and client computing device 106 may access table 116 directly. In another embodiment, table 116 is stored on a computing device external to client computing device 106 (e.g., server 104), and client computing device 106 may access table 116 indirectly (e.g., by requesting access to table 116, by receiving contents of table 116, etc.). Computing system 610, illustrated in FIG. 6, is representative of client computing device 106.

Table 116 may be generated from schematic data corresponding to a machine and/or system of an industrial automation process. For example, Table 116 may be manually and/or autonomously generated based on information obtained from electrical diagrams, process schematics, engineering schematics, schematic maps, and/or any other suitable source of schematic information for a machine and/or its subcomponents. Table 116 may also be generated from one or more delimited text files (e.g., comma-separated values (".CSV") file, tab-separated values (".TSV") file, Extensible Markup Language (".XML"), etc.)). Schematic data may comprise device names, device descriptions, network ID's, and/or other information generated, for example, as part of the design phase of machine and/or system construction. When generated, table 116 may not include information pertaining to device identifiers (e.g., MAC addresses). The device identifiers may be incorporated into table 116, for example, autonomously during commissioning of network ID's. When rendered in a user interface, table 116 may appear as a list, table, graphic, text, chart, figure, and/or have any other presentation format suitable for presenting the contents of file 116.

FIG. 2A illustrates an operational sequence, commissioning process 200A, in an implementation. The steps of commissioning process 200A will be discussed parenthetically in the discussion of FIG. 3 below. FIG. 2B illustrates an operational sequence, commissioning process 200B, in an implementation. The steps of commissioning process 200B will be discussed parenthetically in the discussion of FIG. 3 below. The details provided in FIG. 3 are merely exemplary and not intended to limit the scope of commissioning processes 200A and 200B to the specific implementation shown in FIG. 3.

Figure 3:
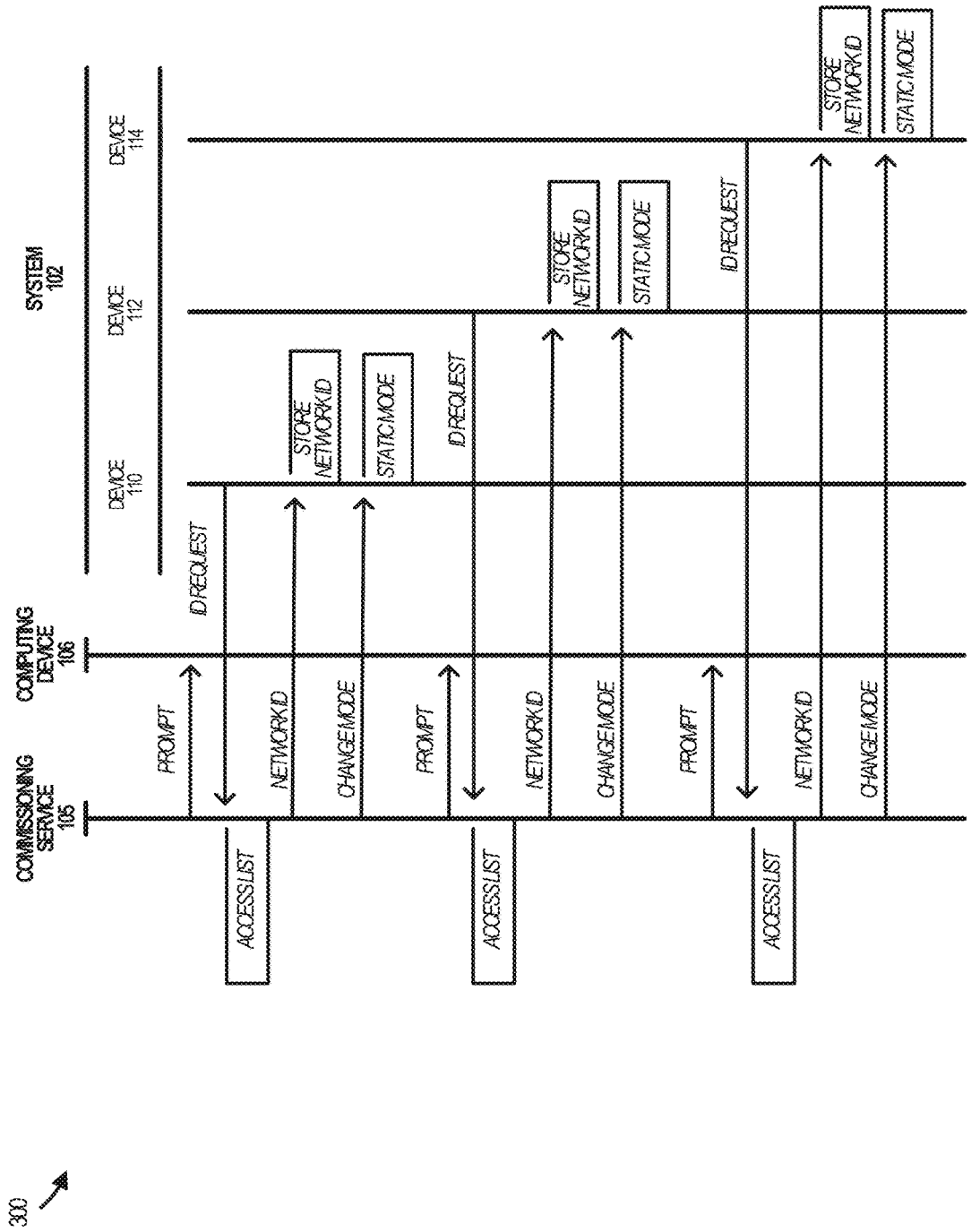
FIG. 3 illustrates an operational sequence of a computing system in an exemplary implementation.

FIG. 3 illustrates operational sequence 300 to demonstrate an implementation of streamlining network ID commissioning. In operation, commissioning service 105 may commence a commissioning process (e.g., commissioning process 200A) when an input is received (e.g., via a user interface of computing device 106). The input may include a selection to commence a commissioning process for the devices of system 102. The input may include a request to generate a file (e.g., table 116) comprising network IDs. The input may include a request to import network IDs and additional content associated with the network IDs. In an embodiment, commissioning service 105 imports the network identifiers and generates an ordered table comprising the network IDs (STEP 202A). The table may be ordered based on one or more aspects of the content contained therein. For example, the table may be ordered based on host name, network ID, description, IP configuration, alphabetically, numerically, missing attributes, present attributes, and/or any other characteristic of the content comprised by the table.

Commissioning service 105 generates one or more prompts for display on computing device 106 (e.g., via network 108). In an implementation, the devices of system 102 (e.g., devices 110, 112, 114) may be in a powered-off operational state (e.g., operational state prior to either power-on, boot, and/or re-boot operational states). In another implementation, the prompt includes a notification to power-off one or more devices of system 102 (e.g., in response to server 104, commissioning service 105, and/or client computing device 106 detecting that one or more devices are in a power-on operational state).

In an embodiment, commissioning service 105 determines that device 110 is the next device in system 102 to be commissioned (STEP 204A). The determination of which device to commission next may be based on an ordered list of network IDs. For example, commissioning service 105 may analyze the ordered list to identify device 110 as missing a device identifier, and therefore, determines that device 110 is next to be commissioned. In another example, commissioning service 105 may analyze the ordered list to identify a first and/or a next position of the ordered list, and determines that device 110 is next to be commissioned because device 110 is located in the first and/or next position of the ordered list.

In response to determining that device 110 should be commissioned next, commissioning service 105 generates a prompt including a notification to power-on, boot, and/or re-boot device 110 and transmits the prompt to client computing device 106 (STEP 206A). Device 110 may be powered-on, booted, and/or re-booted subsequent and/or in response to the transmission of the prompt (e.g., by a user) (STEP 202B). Subsequent to powering-on, booting, and/or re-booting device 110, device 110 connects to the network (e.g., network 108) (STEP 204B) and transmits a request (e.g., a network-identifier request) for a network ID (e.g., an IP address) (STEP 206B). The request may be generated in response to device 110 powering-on, booting, and/or re-booting in either a dynamic assignment mode or an automatic assignment mode. The request may be transmitted to commissioning service 105 and may include a device identifier (e.g., MAC address, tags, labels, and/or any other unique machine identifier).

In an embodiment, commissioning service 105 may receive the request transmitted from device 110 (e.g., directly from device 110 and/or via server 104) (STEP 208A). Commissioning service 105 may identify, obtain, and/or detect the device identifier for device 110 (e.g., by analyzing the content of the request) (STEP 210A). Commissioning service 105 may identify and/or obtain the network ID assigned to device 110 (e.g., by using the content of the request) (STEP 212A). For example, an ordered list (e.g., table 116) may include a plurality of network ID's assigned to the devices of system 102, and commissioning service 105 may use at least an aspect of the content of the request to correlate the network ID's of the ordered list to device 110. Commissioning service 105 may store the device identifier for device 110 in association with the identified network ID (e.g., by updating table 116) (STEP 214A). Commissioning service 105 may generate and/or transmit a response to the request (STEP 216A). For example, commissioning service 105 may generate a response that includes the network ID for device 110, and send the response (e.g., via server 104) to device 110. Device 110 may receive the response from commissioning service 105 (STEP 208B). Subsequent to receiving the response, device 110 may store the network ID locally (STEP 210B).

Commissioning service 105 may generate and/or send, to device 110, a command to change the assignment mode of device 110 to a static assignment mode (STEP 218A). The command to change the assignment mode of device 110 may be sent in response to a user input and/or autonomously (e.g., the command may be sent automatically subsequent to sending the response to device 110; the command may be sent automatically in response to sending the network ID to device 110; the command may be sent automatically to device 110 without user input; etc.). In response to receiving the command, device 110 may change its assignment to a static assignment mode (e.g., from a dynamic assignment mode or an automatic assignment mode) (STEP 212B).

Subsequent to sending the response and/or the command to device 110, commissioning service 105 determines that device 112 is the next device in system 102 to be commissioned (STEP 204A). In response to determining that device 112 should be commissioned next, commissioning service 105 generates a prompt including a notification to power-on, boot, and/or re-boot device 112 and transmits the prompt to client computing device 106 (STEP 206A). Device 112 may be powered-on, booted, and/or re-booted subsequent to the transmission of the prompt (e.g., by a user) (STEP 202B). Subsequent to powering-on, booting, and/or re-booting device 112, device 112 connects to the network (e.g., network 108) (STEP 204B) and transmits a request (e.g., a network-identifier request) for a network ID (e.g., an IP address) (STEP 206B). The request may be generated in response to device 112 powering-on, booting, and/or re-booting in either a dynamic assignment mode or an automatic assignment mode. The request may be transmitted to commissioning service 105 and may include a device identifier (e.g., MAC address, tags, labels, and/or any other unique machine identifier).

In an embodiment, commissioning service 105 may receive the request transmitted from device 112 (e.g., directly from device 112 and/or via server 104) (STEP 208A). Commissioning service 105 may identify, obtain, and/or detect the device identifier for device 112 (e.g., by analyzing the content of the request) (STEP 210A). Commissioning service 105 may identify and/or obtain the network ID assigned to device 112 (e.g., by using the content of the request) (STEP 212A). For example, an ordered list (e.g., table 116) may include a plurality of network ID's assigned to the devices of system 102, and commissioning service 105 may use at least an aspect of the content of the request to correlate the network ID's of the ordered list to device 112. Commissioning service 105 may store the device identifier for device 110 in association with the identified network ID (e.g., by updating table 116) (STEP 214A). Commissioning service 105 may generate and/or transmit a response to the request (STEP 216A). For example, commissioning service 105 may generate a response that includes the network ID for device 112, and send the response (e.g., via server 104) to device 112. Device 112 may receive the response from commissioning service 105 (STEP 208B). Subsequent to receiving the response, device 112 may store the network ID locally (STEP 210B).

Commissioning service 105 may generate and/or send, to device 112, a command to change the assignment mode of device 112 to a static assignment mode (STEP 218A). The command to change the assignment mode of device 112 may be sent in response to a user input and/or autonomously (e.g., the command may be sent automatically subsequent to sending the response to device 112; the command may be sent automatically in response to sending the network ID to device 112; the command may be sent automatically to device 112 without user input; etc.). In response to receiving the command, device 112 may change its assignment to a static assignment mode (e.g., from a dynamic assignment mode or an automatic assignment mode) (STEP 212B).

Subsequent to sending the response and/or the command to device 112, commissioning service 105 determines that device 114 is the next device in system 102 to be commissioned (STEP 204A). In response to determining that device 114 should be commissioned next, commissioning service 105 generates a prompt including a notification to power-on, boot, and/or re-boot device 114 and transmits the prompt to client computing device 106 (STEP 206A). Device 114 may be powered-on, booted, and/or re-booted subsequent to the transmission of the prompt (e.g., by a user) (STEP 202B).

Subsequent to powering-on, booting, and/or re-booting device 114, device 114 connects to the network (e.g., network 108) (STEP 204B) and transmits a request (e.g., a network-identifier request) for a network ID (e.g., an IP address) (STEP 206B). The request may be generated in response to device 114 powering-on, booting, and/or re-booting in either a dynamic assignment mode or an automatic assignment mode. The request may be transmitted to commissioning service 105 and may include a device identifier (e.g., MAC address, tags, labels, and/or any other unique machine identifier). In an embodiment, commissioning service 105 may receive the request transmitted from device 114 (e.g., directly from device 114 and/or via server 104) (STEP 208A). Commissioning service 105 may identify, obtain, and/or detect the device identifier for device 114 (e.g., by analyzing the content of the request) (STEP 210A). Commissioning service 105 may identify and/or obtain the network ID assigned to device 114 (e.g., by using the content of the request) (STEP 212A. For example, an ordered list (e.g., table 116) may include a plurality of network ID's assigned to the devices of system 102, and commissioning service 105 may use at least an aspect of the content of the request to correlate the network ID's of the ordered list to device 114. Commissioning service 105 may store the device identifier for device 114 in association with the identified network ID (e.g., by updating table 116) (STEP 214A). Commissioning service 105 may generate and/or transmit a response to the request (STEP 216A). For example, commissioning service 105 may generate a response that includes the network ID for device 114, and send the response (e.g., via server 104) to device 114. Device 114 may receive the response from commissioning service 105 (STEP 208B). Subsequent to receiving the response, device 114 may store the network ID locally (STEP 210B).

Commissioning service 105 may generate and/or send, to device 114, a command to change the assignment mode of device 114 to a static assignment mode (STEP 218A). The command to change the assignment mode of device 114 may be sent in response to a user input and/or autonomously (e.g., the command may be sent automatically subsequent to sending the response to device 114; the command may be sent automatically in response to sending the network ID to device 114; the command may be sent automatically to device 114 without user input; etc.). In response to receiving the command, device 114 may change its assignment to a static assignment mode (e.g., from a dynamic assignment mode or an automatic assignment mode) (STEP 212B). Subsequent to sending the response and/or the command to device 114, commissioning service 105 may determine no additional devices of system 102 need to be commissioned. For example, commissioning service 105 may analyze the ordered list of network IDs and determine all of the devices have device identifiers. In another example, commissioning service 105 may analyze the ordered list and determine all of the devices of system 102 have been commissioned. In a further example, commissioning service 105 may analyze the ordered list and determine that some devices of system 102 are slated for commissioning at a later time (e.g., an input was received to skip the commissioning of one or more device, etc.).

In an embodiment, commissioning service 105 may terminate its commissioning process in response to determining no additional devices of system 102 need to be commissioned. In another embodiment, commissioning service 105 may terminate its commissioning process in response to receiving an input to terminate the commissioning process for the devices of system 102.

Figure 4A:
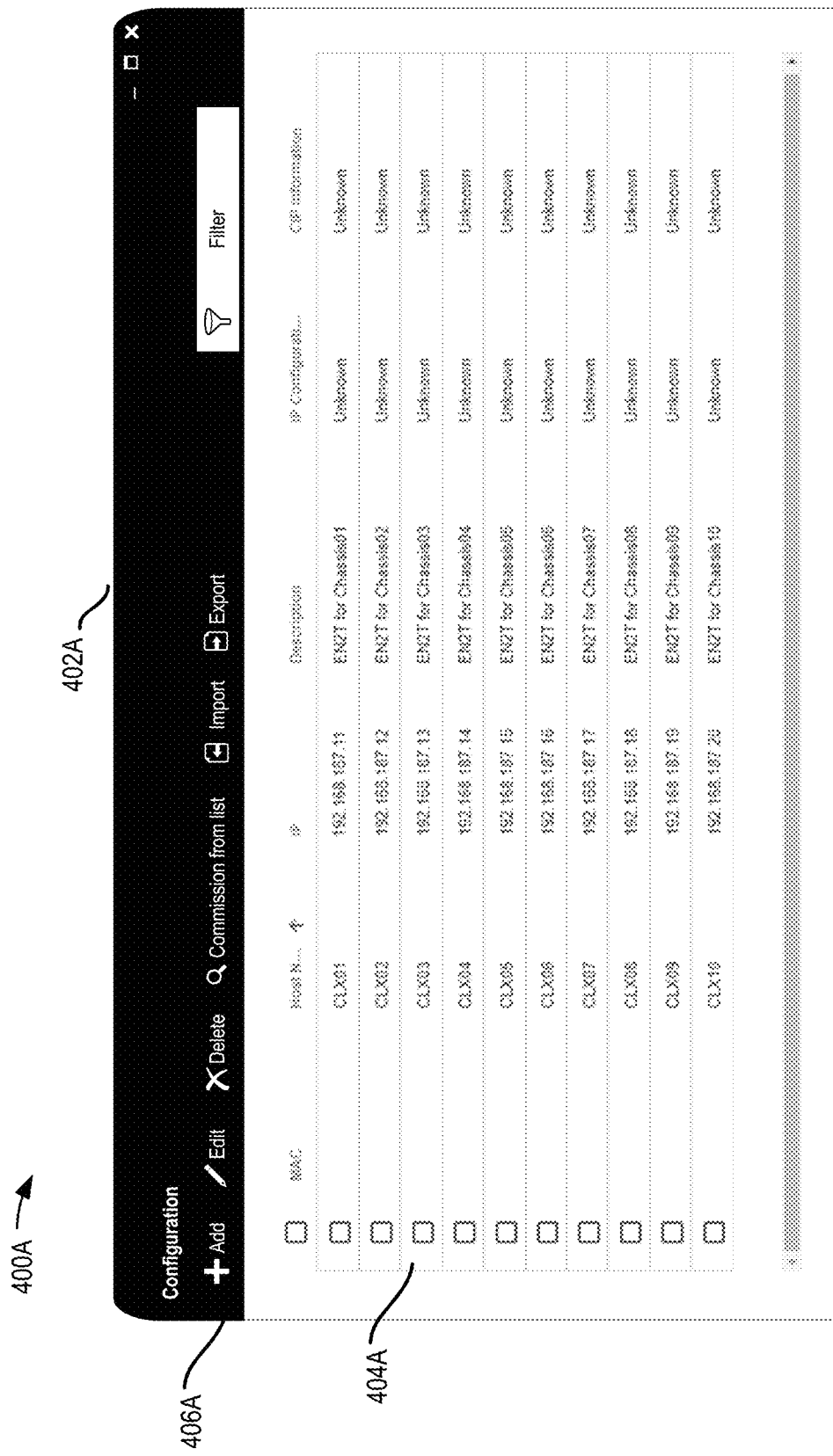
FIG. 4A illustrates a user interface of a computing system in an exemplary implementation.

FIG. 4A illustrates a brief operational scenario 400A to further illustrate aspects of streamlining network ID commissioning. In operational scenario 400A, user interface 402A includes list view 404A. List view 404A may include a list of network ID's (e.g., IP addresses) in association with a device name and/or a device description. The list of network ID's may be obtained from data stored in memory on a machine that executes commissioning operation 200A or on a computing device external to the machine that executes commissioning operation 200A. The list of network ID's may comprise a specific order (e.g., ordered according to host name, ordered according to device description, ordered according to device status, ordered according to column header label, etc.). User interface 402A may be configured to filter content of the list of network ID's.

List view 404A may also include information pertaining to device identifiers (e.g., MAC addresses). In operational scenario 400A, the column for MAC addresses (i.e., device identifiers) contains no information because values for the MAC addresses of the devices displayed in list view 404A may not be available to user interface 402A (e.g., the values for the MAC addresses may not yet be stored in association with the list of network ID's and/or device names).

In operational scenario 400A, user interface 402A further includes an options bar 406A for manipulating the content displayed in list view 404A. For example, options bar includes an add feature, an edit feature, a delete feature, a commission from list feature, an import feature, and an export feature. In an embodiment, selection of the add feature may cause a new row to be inserted in the list of network ID's. Information may be entered, manually or by some other means, into the new row. In another embodiment, selection of the edit feature may cause the list of network ID's to become editable, and selection of the delete feature may cause one or more rows of the list of network ID's to be deleted. Selection of the delete feature may also cause the entire table to be removed from list view 404A.

In an embodiment, selection of the import feature may enable importation of data to generate the list of network ID's, and selection of the export feature may enable exportation of the data comprised by the list of network ID's. A selection of the commission feature from list feature may result in display of a prompt to sequentially initialize each device of a machine and/or system (e.g., the one or more devices displayed in the list of network ID's). A selection of the commission feature from list feature may also automate the collection of device identifiers (e.g., MAC addresses) and facilitate the loading of network ID's on the devices of the machine and/or system.

Figure 4B:
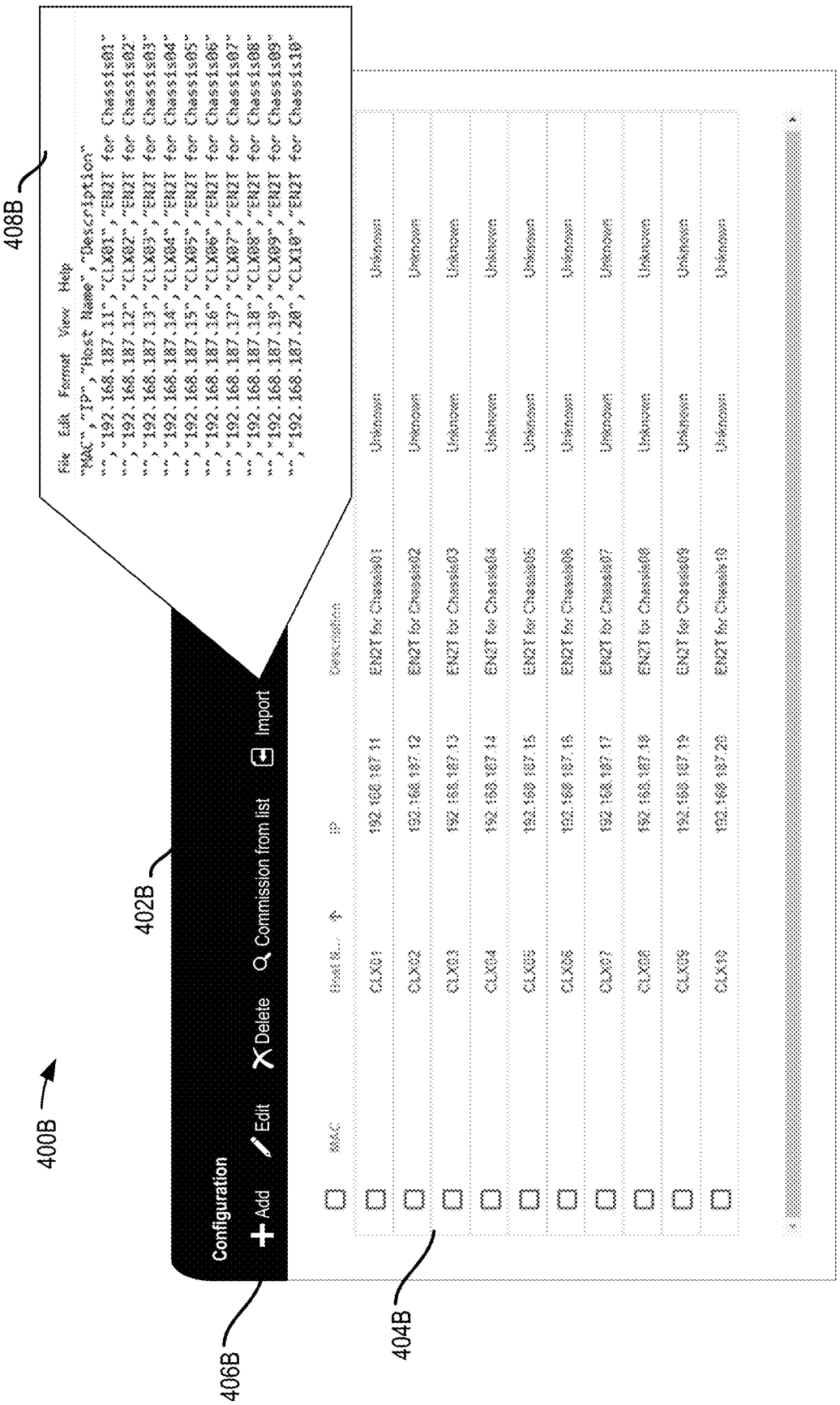
FIG. 4B illustrates a user interface of a computing system in an exemplary implementation.

FIG. 4B illustrates a brief operational scenario 400B to further illustrate aspects of streamlining network ID commissioning. In operational scenario 400B, user interface 402B includes list view 404B and options bar 406B. List view 404B may include a list of IP addresses (i.e., network ID's). Options bar 406B may include an add feature, an edit feature, a delete feature, a commission from list feature, an import feature, and an export feature (not shown).

In response to a selection of the import feature, prompt 408B may be displayed integrated with user interface 402B or as a separate user interface (e.g., in a pop-up window).

Prompt 408B may be configured to receive inputs for obtaining data associated with the list of IP addresses, initiate the collection of the data associated with the list of IP addresses, and initiate the storage of the data associated with the list of IP addresses.

Figure 5:
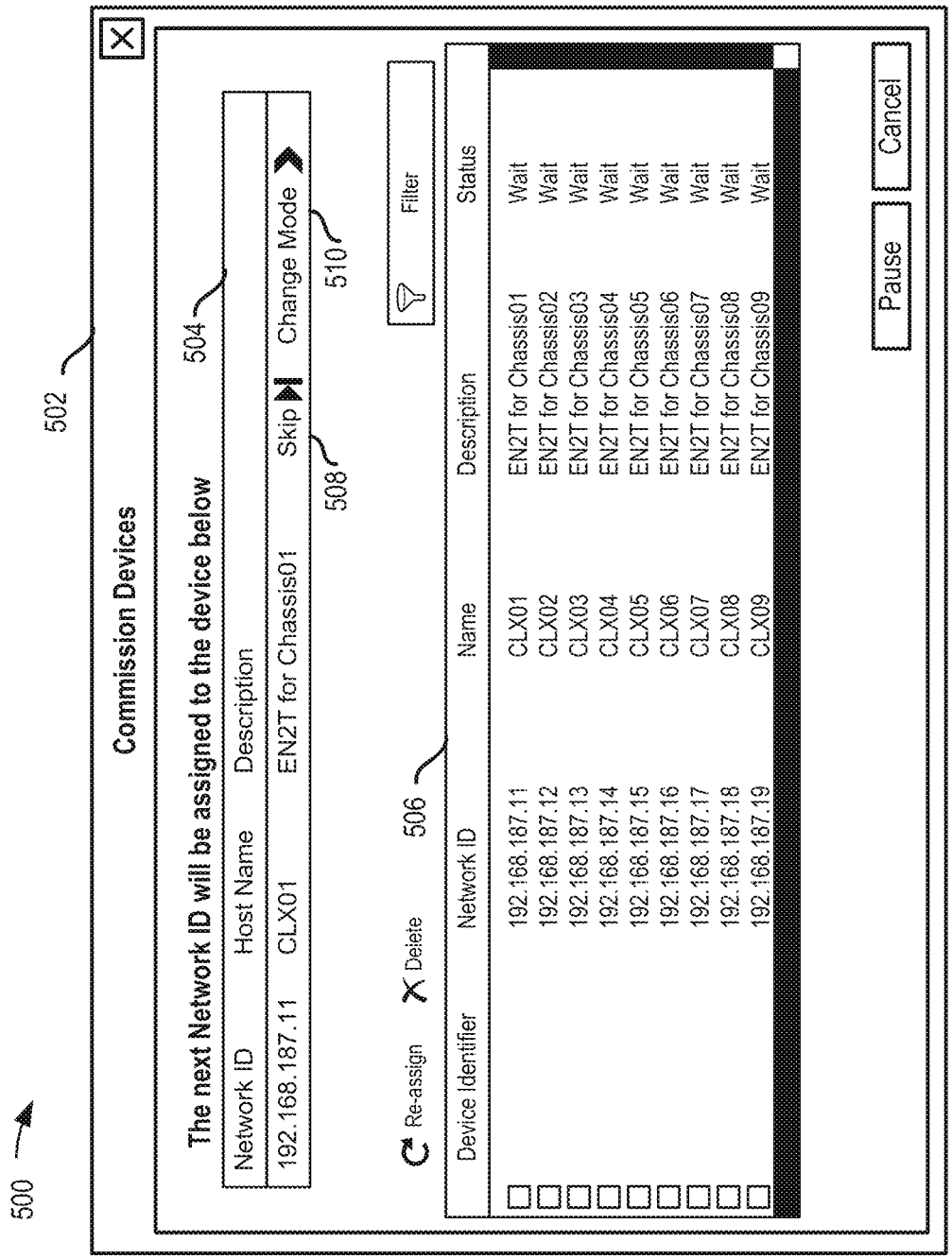
FIG. 5 illustrates a user interface of a computing system in an exemplary implementation.

FIG. 5 illustrates an operational scenario 500 to further illustrate aspects of streamlining network ID commissioning. In operational scenario 500, user interface 502 includes prompt area 504 and list view 506. The elements depicted in prompt area 504 and list view 506 are shown in these regions of user interface 502 merely for exemplary purposes, and embodiments where the elements are rendered in other locations of user interface 502 are contemplated herein.

Prompt area 504 may include information pertaining to assignment and/or commissioning of a network ID to a next device of a system of devices (e.g., system 102). For example, prompt area 504 may indicate the name and/or description of the device that is next to receive a network ID. Additionally, prompt area 504 may include an instruction to power-up the device that is next to receive a network ID. The information presented via prompt area 504 may be obtained from list view 506 and/or from a data source of list view 506.

Prompt area 504 may comprise selectable options (e.g., selectable options 508 and 510). A selection of option 508 may cause the network ID commissioning process to skip commissioning the device that is next to receive a network ID and render in prompt area 504 the name and/or description of a different device listed list view 506 (e.g., the device listed in the top most position of list view 506). A selection of option 510 may cause the network ID commissioning process to send a command, to the device that is next to receive a network ID, for the device to change its assignment mode. In response to receiving the command, the device may change its assignment mode (e.g., from a dynamic assignment mode to a static assignment mode).

List view 506 may include a list of network ID's associated with a machine and/or system of an industrial automation process. Each of the network ID's are stored in association with a device name and/or a device description. The list of network ID's may be obtained from data stored in memory on a machine that executes commissioning operation 200A or on a computing device external to the machine that executes commissioning operation 200A. The list of network ID's may comprise a specific order (e.g., ordered according to device name, ordered according to device description, ordered according to device status, etc.).

List view 506 may also include information pertaining to device identifiers (e.g., MAC addresses). In operational scenario 500, the column for device identifiers contains no information because values for the device identifiers of the devices displayed in list view 506 may not be available to user interface 502 (e.g., the values for the device identifiers may not yet be stored in association with the list of network ID's).

FIG. 6 is a block diagram that illustrates an industrial automation environment 600 in an exemplary implementation. Industrial automation environment 600 provides an exemplary environment in which to implement the device commissioning systems and processes disclosed herein, but other environments could also be used. Industrial automation environment 600 includes computing system 610, industrial assets 630, 631, 632, network 645 (e.g., the network can be wired, wireless or a combination thereof), application server 670 and control device 620. Note that there would typically be many more industrial assets in most industrial automation environments, but the number of industrial assets shown in FIG. 6 has been restricted for clarity in this non-limiting example.

Industrial automation environment 600 comprises an automobile manufacturing factory, food processing plant, oil drilling operation, microprocessor fabrication facility, or some other type of industrial enterprise. Industrial assets 630, 631, 632 could comprise sensors, drives, pumps, filters, drills, motors, robots, fabrication machinery, mills, printers, or any other industrial automation equipment, including their associated control systems (e.g., automation controllers, programmable logic controllers (PLCs), programmable automation controllers (PACs), or any other controllers used in automation control). Additionally, industrial assets 630, 631, 632 could comprise other industrial equipment, such as brew kettles in a brewery, reserves of coal or other resources, or other elements that may reside in an industrial automation environment 600.

Communication between computing system 610 and industrial assets 630, 631, 632 may be achieved using initiating links such as the link 685 shown between computing system 610 and industrial asset 630. Computing system 610 is also able to communicate with industrial assets 630, 631, 632 via network 645 (e.g., through a server 670 or other communication device that coordinates communications on communication network 645). Each industrial asset can be identified in one or more ways, for example by using identifying data supplied by the discovered industrial asset.

Computing system 610 is also able to communicate with a control device 620 via network 645 (e.g., through server 670 or other communication device that coordinates communications on communication network 645). Network 645 permits full functional communication between devices communicating over network 645. Control device 620 can include desktop computers, laptop computers, server computers, and virtual machines, as well as any other type of computing system, variation, or combination thereof In industrial environment 600 industrial assets 630, 631, 632 are able to communicate with control device 620 and the like using network 645. In some examples, server 670 controls network 645 and/or communication between such network elements directly. In other examples various industrial assets might utilize a secondary communication device 634 (e.g., a router, gateway, telecommunication switch, server, processing system, or other communication equipment) as proxy for the industrial assets coupled to the secondary communication device 634. Network 645 can include multiple servers, multiple control devices, multiple secondary devices and numerous industrial assets and the configuration illustrated in FIG. 6 is provided as a non-limiting example of an implementation.

The communication links over which data is exchanged between various components of environment 600 can comprise multiple network elements such as routers, gateways, telecommunication switches, servers, processing systems, or other communication equipment and systems for providing communication and data services. These communication links could use various communication protocols, such as time-division multiplexing ("TDM"), IP, Ethernet, telephony, optical networking, packet networks, wireless mesh networks ("WMN"), local area networks ("LAN"), metropolitan area networks ("MAN"), wide area networks ("WAN"), hybrid fiber coax ("HFC"), communication signaling, wireless protocols, communication signaling, peer-to-peer networking over Bluetooth, Bluetooth low energy, Wi-Fi Direct, near field communication ("NFC"), or some other communication format, including combinations thereof. The communication links could be direct links or may include intermediate networks, systems, or devices.

Computing system 610 may be representative of any portable computing apparatus, system, or systems on which the wireless communication linking processes disclosed herein or variations thereof may be suitably implemented. Examples of computing system 610 include mobile computing devices, such as cell phones, smartphones, tablet computers, laptop computers, notebook computers, handheld computers, wearable computer devices, and gaming devices, as well as any other type of computing devices and any combination or variation thereof. In some implementations, computing system 610 can comprise a computing device capable of operating in a server-like fashion. In other implementations, application server 670 can comprise computing system 610.

Computing system 610 includes processing system 601, storage system 602, software 603, communication interface 608, and user interface 609. Processing system 601 is operatively coupled with storage system 602, communication interface 608, and user interface 609. Processing system 601 loads and executes software 603 from storage system 602. Software 603 includes one or more applications 606 and operating system 607. Applications 606 may include device commissioning processes 200A and 200B, in some examples. When executed by computing system 610 in general, and processing system 601 in particular, software 603 directs computing system 610 to operate as described herein for device commissioning processes 200A and 200B or variations thereof. In this example, user interface 609 includes display system 605, which itself may be part of a touch screen that also accepts user inputs via touches on its surface. Computing system 610 may optionally include additional devices, features, or functionalities not discussed here for purposes of brevity.

Referring still to FIG. 6, processing system 601 may comprise a microprocessor and other circuitry that retrieves and executes software 603 from storage system 602. Processing system 601 may be implemented within a single processing device but may also be distributed across multiple processing devices or sub-systems that cooperate in executing program instructions. Examples of processing system 601 include general purpose central processing units, application specific processors, and logic devices, as well as any other type of processing device, combinations, or variations thereof.

Storage system 602 may comprise any computer-readable medium or storage medium readable by processing system 601 and capable of storing software 603. Storage system 602 may include volatile and nonvolatile, removable and non-removable media implemented in any method or technology for storage of information, such as computer-readable instructions, data structures, program modules, or other data. Storage system 602 may be implemented as a single storage device but may also be implemented across multiple storage devices or sub-systems co-located or distributed relative to each other. Storage system 602 may comprise additional elements, such as a controller, capable of communicating with processing system 601. Examples of storage medium include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage medium a propagated signal.

In operation, in conjunction with user interface 609, processing system 601 loads and executes portions of software 603, such as device commissioning processes 200A and 200B, to render a graphical user interface for application 606 for display by display system 605 of user interface 609. Software 603 may be implemented in program instructions and among other functions may, when executed by computing system 610 in general or processing system 601 in particular, direct computing system 610 or processing system 601 to display one or more prompts, statuses, and/or function screens associated with one or more industrial assets of an industrial automation environment on display system 605 of computing system 610. In addition, software 603 directs computing system 610 or processing system 601 to store an ordered list comprising network ID's, receive a request from one or more of industrial assets 630, 631, 632, and identify a device identifier of at least one of industrial assets 630, 631, 632. Finally, software 603 may direct computing system 610 or processing system 601 to store the device identifier, determine a network ID for at least one of industrial assets 630, 631, 632, generate a response comprising the network ID, and transmit the response to at least one of industrial assets 630, 631, 632.

Software 603 may include additional processes, programs, or components, such as operating system software or other application software. Examples of operating systems include Windows®, iOS®, and Android®, as well as any other suitable operating system. Software 603 may also comprise firmware or some other form of machine-readable processing instructions executable by processing system 601.

In general, software 603 may, when loaded into processing system 601 and executed, transform computing system 610 overall from a general-purpose computing system into a special-purpose computing system customized to facilitate linking target devices in an industrial automation environment to one or more control devices as described herein for each implementation. For example, encoding software 603 on storage system 602 may transform the physical structure of storage system 602. The specific transformation of the physical structure may depend on various factors in different implementations of this description. Examples of such factors may include, but are not limited to the technology used to implement the storage media of storage system 602 and whether the computer-readable storage media are characterized as primary or secondary storage.

In some examples, if the computer-readable storage media are implemented as semiconductor-based memory, software 603 may transform the physical state of the semiconductor memory when the program is encoded therein. For example, software 603 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 610 is generally intended to represent a computing system with which software 603 is deployed and executed in order to implement application 606 and/or device commissioning processes 200A and 200B (and variations thereof). However, computing system 610 may also represent any computing system on which software 603 may be staged and from where software 603 may be distributed, transported, downloaded, or otherwise provided to yet another computing system for deployment and execution, or yet additional distribution. For example, computing system 610 could be configured to deploy software 603 over the internet to one or more client computing systems for execution thereon, such as in a cloud-based deployment scenario.

Communication interface 608 may include communication connections and devices that allow for communication between computing system 610 and other computing systems (not shown) or services, over a communication network 645 or collection of networks. In some implementations, communication interface 608 receives data over communication network 645, via a backchannel 625 and/or via link 685. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 609 may include a voice input device, a touch input device for receiving a gesture from a user, a motion input device for detecting non-touch gestures and other motions by a user, and other comparable input devices and associated processing elements capable of receiving user input. Output devices such as display system 605, speakers, haptic devices, and other types of output devices may also be included in user interface 609. The aforementioned user input devices are well known in the art and need not be discussed at length here. User interface 609 may also include associated user interface software executable by processing system 601 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the streamlining the commissioning of industrial automation devices, other applications, such as the streamlining of any man-made process, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A non-transitory computer-readable medium having stored thereon instructions that, in response to execution, cause a system comprising a processor to perform operations, the operations comprising:
    subsequent to identifying, based at least on an ordered list comprising network identifiers (network ID's), a device of an industrial automation system, rendering instructions to power-on the device; and
    in response to receiving a network-identifier request from the device:
        identifying, based at least in part on content of the network-identifier request, a device identifier of the device;
        autonomously determining, based at least on the ordered list, a network ID of the network ID's;
        storing the device identifier in association with the ordered list, including by autonomously incorporating the device identifier into the ordered list;
        generating a response comprising the network ID; and
        transmitting the response to the device.

2. The non-transitory computer-readable medium of claim 1 wherein the device has an initial assignment mode of at least one of a dynamic assignment mode and an automatic assignment mode.

3. The non-transitory computer-readable medium of claim 2 wherein the operations further comprise:
    sending, to the device, a command to change from the initial assignment mode to a static assignment mode.

4. The non-transitory computer-readable medium of claim 1 wherein the operations further comprise:
    in response to receiving an additional network-identifier request from a second device of the industrial automation system:
        identifying a second-device identifier;
        storing the second-device identifier;
        autonomously determining, based at least on the ordered list, a second-network ID of the network ID's;
        generating a second-response comprising the second-network ID; and
        transmitting the second-response to the second device.

5. The non-transitory computer-readable medium of claim 1 wherein the operations further comprise:
    subsequent to transmitting the response to the device, initiating rendering, by the system and in a user interface, of additional instructions to commence commissioning of a second device based at least on the ordered list.

6. The non-transitory computer-readable medium of claim 5 wherein the user interface comprises a selectable option to skip the commissioning of the second device, and wherein the operations further comprise, in response to a selection of the selectable option, initiating rendering, by the system and in the user interface, of new instructions to power-up a third device based at least on the ordered list.

7. A method for commissioning of network identifiers (ID's) comprising:
    storing, by a system comprising a processor, an ordered list comprising the network ID's;
    subsequent to identifying, based at least on the ordered list, a device of an industrial automation system, rendering, by the system and in a user interface, instructions to power-on the device;

in response to receiving a network-identifier request from the device:
autonomously identifying, by the system, a device identifier of the device;
autonomously correlating, by the system, the device with a network ID of the network ID's;
updating, by the system, the ordered list with the device identifier, including by autonomously incorporating the device identifier into the ordered list;
generating, by the system, a response comprising the network ID; and
transmitting, by the system, the response to the device; and
generating, by the system, a prompt comprising instructions to boot a second device according to an order of the ordered list.

8. The method of claim 7 wherein the device has an initial assignment mode of at least one of a dynamic assignment mode and an automatic assignment mode.

9. The method of claim 8 further comprising:
sending, by the system and to the device, a command to change from the initial assignment mode to a static assignment mode.

10. The method of claim 8 further comprising:
in response to receiving an additional network-identifier request from a second device of the industrial automation system:
identifying, by the system, a second-device identifier;
storing, by the system, the second-device identifier;
autonomously determining, by the system and based at least on the ordered list, a second-network ID of the network ID's;
generating, by the system, a second-response comprising the second-network ID; and
transmitting, by the system, the second-response to the second device.

11. The method of claim 7 wherein the user interface comprises a selectable option to skip the instructions, and wherein the method further comprises, in response to a selection of the selectable option, initiating rendering, by the system and in the user interface, of new instructions to power-up a third device according to the ordered list.

12. The method of claim 7 wherein autonomously identifying the device identifier includes detecting the device identifier in the network-identifier request.

13. A system for commissioning of network identifiers (network ID's) comprising:
a memory that stores executable components; and
a processor, operatively coupled to the memory, that executes the executable components, the executable components comprising:
a storage component configured to:
receive an ordered list comprising the network ID's,
store the ordered list,
receive a device identifier, and
store the device identifier; and
a network-identifier component operatively coupled to the storage component and configured to:
subsequent to identifying, based at least on the ordered list, a device of an industrial automation machine, render, in a user interface, instructions to power-on the device, and
in response to receiving a network-identifier request from a device of an industrial automation process:
identify a device identifier of the device,
transmit the device identifier to the storage component,
generate an updated ordered list by autonomously incorporating the device identifier into the ordered list,
autonomously determine, based at least on the ordered list, a network ID of the network ID's,
generate a response comprising the network ID, and
transmit the response to the device.

14. The system of claim 13 wherein the storage component is configured to store the updated ordered list.

15. The system of claim 13 wherein the device has an initial assignment mode of at least one of a dynamic assignment mode and an automatic assignment mode.

16. The system of claim 15 wherein the network-identifier component is further configured to transmit, to the device, a command to change from the initial assignment mode to a static assignment mode.

17. The system of claim 13 wherein the user interface component is further configured to, in response to a notification of the response being transmitted, initiate rendering, based at least on the order of the ordered list, of additional instructions to commence commissioning of a second device.

18. The system of claim 13 wherein the user interface comprises a selectable option to skip the instructions, and wherein the user interface component is further configured to, in response to a selection of the selectable option, initiate rendering, based at least on the ordered list, of additional instructions to power-up a second device.

\* \* \* \* \*